April 30, 1957
W. HERRSCHAFT
2,790,524
STRUCTURAL SUPPORTS
Filed July 26, 1955
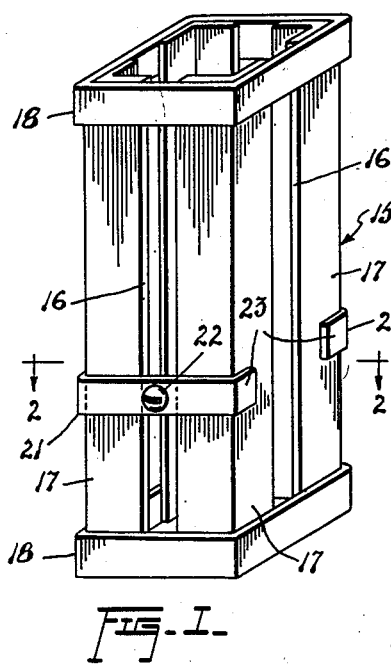
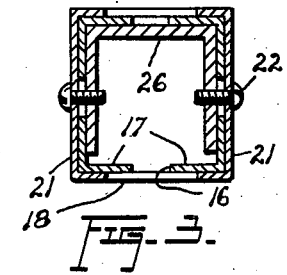
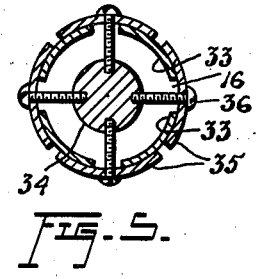
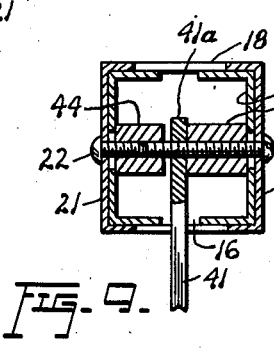
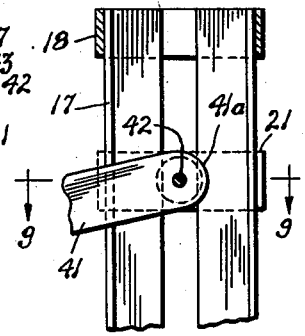
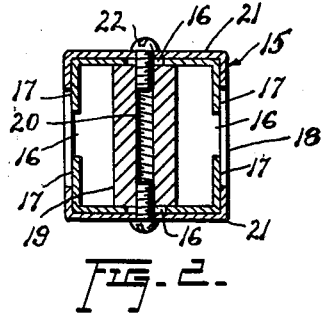
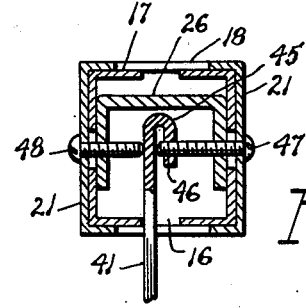
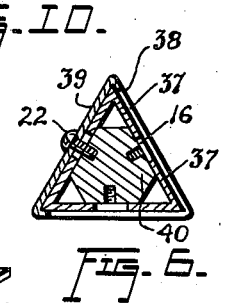
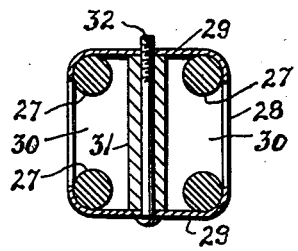
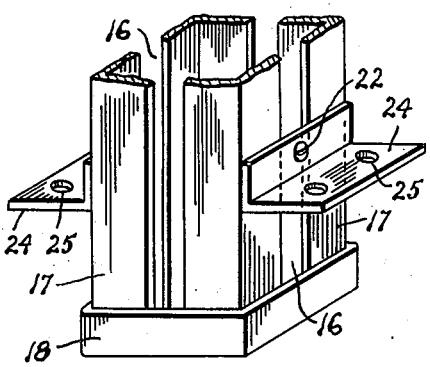
Inventor:
William Herrschaft

United States Patent Office 2,790,524
Patented Apr. 30, 1957

2,790,524

STRUCTURAL SUPPORTS

William Herrschaft, New York, N. Y.

Application July 26, 1955, Serial No. 524,440

3 Claims. (Cl. 189—39)

This invention relates to new and useful improvements in structural supports, and in particular the invention concerns itself with a column type structural support having brackets thereon for attachment of various elements such as shelves, panels, etc., thereto.

The principal object of the invention is to facilitate convenient and expeditious adjustment of such brackets longitudinally of the column, while another feature of the invention resides in a novel construction of the column itself.

Some of the advantages of the invention lie in its simplicity, ease of fabrication, and adaptability for use in a wide variety of different environments.

With the foregoing more important objects and features in view and such other objects and features as may become apparent as this specification proceeds, the invention resides in the details of construction and arrangement of parts substantially as shown in the accompanying drawing, wherein like characters of reference are used to designate like parts and wherein:

Figure 1 is a perspective view of a column type structural support in accordance with the invention;

Figure 2 is a cross-sectional view, taken substantially in the plane of the line 2—2 in Figure 1;

Figure 3 is a cross-sectional view, similar to that in Figure 1 but showing a modified form of the core member;

Figure 4 is a cross-sectional view of a modified column structure;

Figure 5 is a cross-sectional view of a further modified column structure;

Figure 6 is a cross-sectional view of a still further modified column structure;

Figure 7 is a fragmentary perspective view of the column shown in Figure 1 with modified brackets;

Figure 8 is a vertical sectional view of the column of Figure 1 with a supporting arm;

Figure 9 is a cross-sectional view, taken substantially in the plane of the line 9—9 in Figure 8; and Figure 10 is a cross-sectional view, similar to that shown in Figure 9, but showing a modified arrangement of the arm.

Referring now to the accompanying drawing in detail, particularly to Figures 1 and 2 thereof, the column type structural support is designated generally by the reference numeral 15 and is in the form of a hollow column body having side walls provided with pairs of opposing, longitudinally extending slots 16.

The column is preferably constructed from a set of angle bar sections 17 disposed in parallel relation and having spaced longitudinal edges affording the slots 16 therebetween, as will be clearly apparent. The sections 17 are rigidly secured together at the ends of the column by perimetrically extending bands 18.

A core member 19, in the form of a block, is adjustable longitudinally in the column and is provided with a screw-threaded bore or aperture 20, in register with a pair of the opposed slots 16. Moreover, a pair of brackets 21, or the like, are disposed at the outer surface of the column and are provided with fastening elements such as the screws 22 which extend inwardly through the slots 16 into the bore 20 of the core member. It will be apparent from the foregoing that when the screws 22 are tightened, the brackets 21 as well as the core member 19 will be fixed in a predetermined position on the column, but may be adjusted longitudinally of the column by simply loosening the screws.

To prevent the brackets 21 from turning on the screws 22, they may be provided with angulated flanges 23 in supportable engagement with the lateral sides of the column and the brackets as well as the screws 22 may be used for attaching shelves, panels, and other structural elements to the column, as desired.

In the modified form of the invention shown in Figure 7, the brackets 24 assume the form of angles having flanges provided with apertures 25 for attachment of various structural elements thereto.

Figure 3 illustrates a column with a modified form of the core member 26 which, in this instance, is in the form of a U and, because of its hollow nature, permits unobstructed passage of wires, etc., through the column in environments such as where the column is used to support a lamp, or the like.

Figure 4 illustrates a modified column structure wherein a set of round rods or bars 27, disposed in spaced parallel relation, are used in place of the aforementioned angle bars 17, the rods 27 being secured together at the ends of the column by perimetric bands 28, and the end portions of the brackets 29 being curved to fit the rods, as shown. It will be noted that the spaces or slots 30 between the rods are substantially wide. If desired, the core member 31 may be formed with a plain, unthreaded bore to receive a single clamping screw 32 threaded through one of the brackets 29. However, the double screw arrangement shown in Figures 1 and 2 has the additional advantage that one of the screws may be tightened to fix the core member in a predetermined position along the length of the column, while a shelf, panel or other structural element is being installed on the second screw. Thus, any possibility of the core member shifting in the column during the installation of the shelf, etc., is eliminated.

Figure 5 illustrates a further modified column construction which, in this instance, is cylindrical in form, utilizing a set of arcuate column sections 33, a rod-shaped core 34 and arcuate brackets 35 secured by screws 36 extending into the core, as shown. It is to be noted that while in Figures 2, 3 and 4 the core member extends transversely in the column from one side to the other and engages the column walls, the core member 34 in Figure 5 is disposed centrally in the column in spaced relation therewith.

The further modified column structure in Figure 6 is triangular in cross-section, utilizing V-shaped column sections 37 secured together by triangular bands 38 and provided with brackets 39 fastened by the screws 22 to the core member 40. Obviously, the column may also have any other polygonal section, such as that of a pentagon, hexagon, and the like.

In the arrangement shown in Figures 8 and 9 a support arm 41 is connected to the column structure for attaching various structural elements to the column or for connecting two or more columns together. The arm 41 extends through one of the open slots 16 in the column and has an apertured inner end portion 41a mounted on a clamping screw 42 extending from one of the brackets 21 into a core member 43. The clamping screw of the second bracket extends into a core member 44 which also receives an end portion of the screw 42. The two core members 43, 44 are spaced apart as shown, so that the arm 41 may be swung on the screw 42 relative to the column.

Finally, Figure 10 shows a slightly modified form of the support arm 41 having a U-shaped inner end portion 45 provided with an aperture 46 to receive the clamping screw 47 and clamped between the opposing inner ends of the screws 47, 48. In this manner the arm is fixed relative to the column and to accommodate the U-shaped portion 45 of the arm, a hollow core member 26 is employed, as illustrated.

While in the foregoing there have been shown and described the preferred embodiments of the invention, various other modifications may become apparent to those skilled in the art to which the invention relates. Accordingly, it is not desired to limit the invention to this disclosure, and various modifications may be resorted to, such as may fall within the spirit and scope of the appended claims.

What is claimed as new is:

1. A structural support comprising a hollow column having side walls provided with a plurality of longitudinally extending slots at least two of which are diametrically opposed, a core member adjustable longitudinally in said column and having apertures in register with the opposed slots, brackets provided at the outer surface of said side walls, fastening elements extending from said brackets through the opposed slots into the apertures of said core member, whereby the core member and said brackets may be fixed in a predetermined position longitudinally of the column, and a support arm extending through another of said slots in said column and having its inner end portion mounted on one of said fastening elements.

2. The structure as defined in claim 1 wherein said arm is swingably mounted on one of said fastening elements.

3. The structure as defined in claim 1 wherein said arm has its inner end portion frictionally clamped between said fastening elements.

References Cited in the file of this patent

UNITED STATES PATENTS

| 722,635 | Schneider | Mar. 10, 1903 |
| 1,684,894 | Smiley | Sept. 18, 1928 |

FOREIGN PATENTS

| 673,690 | France | Oct. 8, 1929 |